Figure 1:
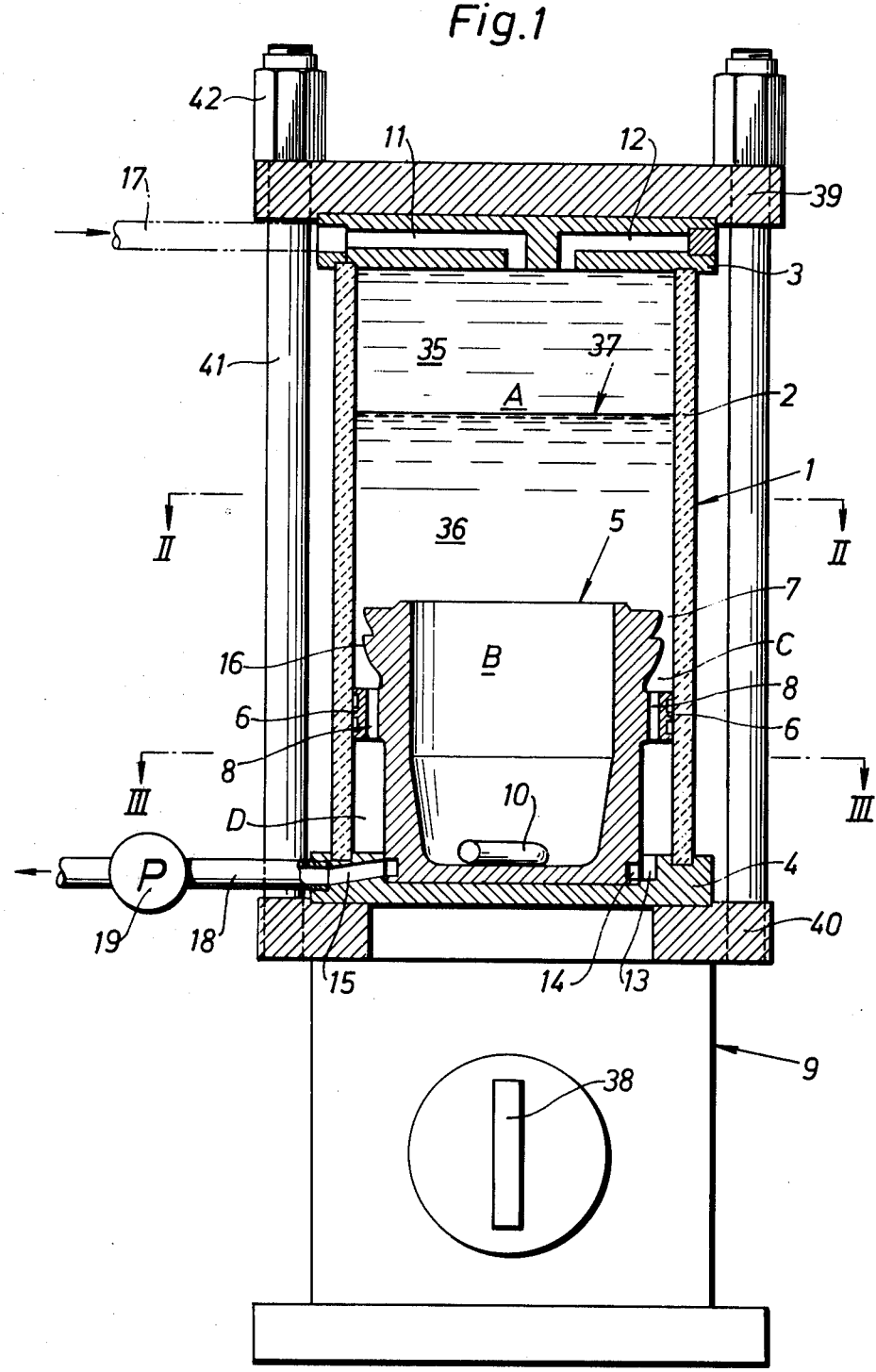

United States Patent [19]

Josefsson et al.

[11] 3,996,140
[45] Dec. 7, 1976

[54] APPARATUS FOR CONTINUOUS LIQUID-LIQUID EXTRACTION OF WATER WITH A SOLVENT

[75] Inventors: Björn Olof Josefsson; Martin Ahnoff, both of Goteborg, Sweden

[73] Assignee: AB Tellusond, Goteborg, Sweden

[22] Filed: Feb. 7, 1975

[21] Appl. No.: 548,018

[52] U.S. Cl. .............................. 210/205; 23/267 MS; 210/21; 210/219
[51] Int. Cl.² ........................................ B01D 11/04
[58] Field of Search .......... 23/267 A, 267 F, 269 V, 23/267 MS, 270.5 R; 210/21, 205, 216; 259/DIG. 46

[56] References Cited
UNITED STATES PATENTS

| | | | |
|---|---|---|---|
| 2,630,367 | 3/1953 | Dunn | 23/267 MS X |
| 2,667,407 | 1/1954 | Fenske et al. | 210/21 X |
| 2,710,250 | 6/1955 | Andrews et al. | 210/21 X |
| 2,912,343 | 11/1959 | Collins et al. | 259/DIG. 46 |
| 3,162,510 | 12/1964 | Meissner et al. | 23/267 MS |
| 3,220,802 | 11/1965 | Hartley | 259/DIG. 46 |
| 3,245,665 | 4/1966 | Steel | 259/DIG. 46 |
| 3,247,103 | 4/1966 | Shang | 210/21 |

FOREIGN PATENTS OR APPLICATIONS 1,123,847  8/1968  United Kingdom ............ 23/269 V

*Primary Examiner*—Charles N. Hart
*Assistant Examiner*—Robert H. Spitzer
*Attorney, Agent, or Firm*—Pierce, Scheffler & Parker

[57] ABSTRACT

An apparatus for extracting dissolved substances from water by means of a solvent comprises an extraction vessel, a mixing container, open at the top, in the lower portion the extraction vessel, and stirring means in said mixing container. The extraction vessel contains a desired quantity of solvent. The water is added in a continuous flow and is mixed with the solvent. The lighter solvent phase rises to the top of the apparatus, while the heavier water phase is continuously withdrawn through an annular space between the mixing container and the wall of the extraction vessel.

3 Claims, 4 Drawing Figures

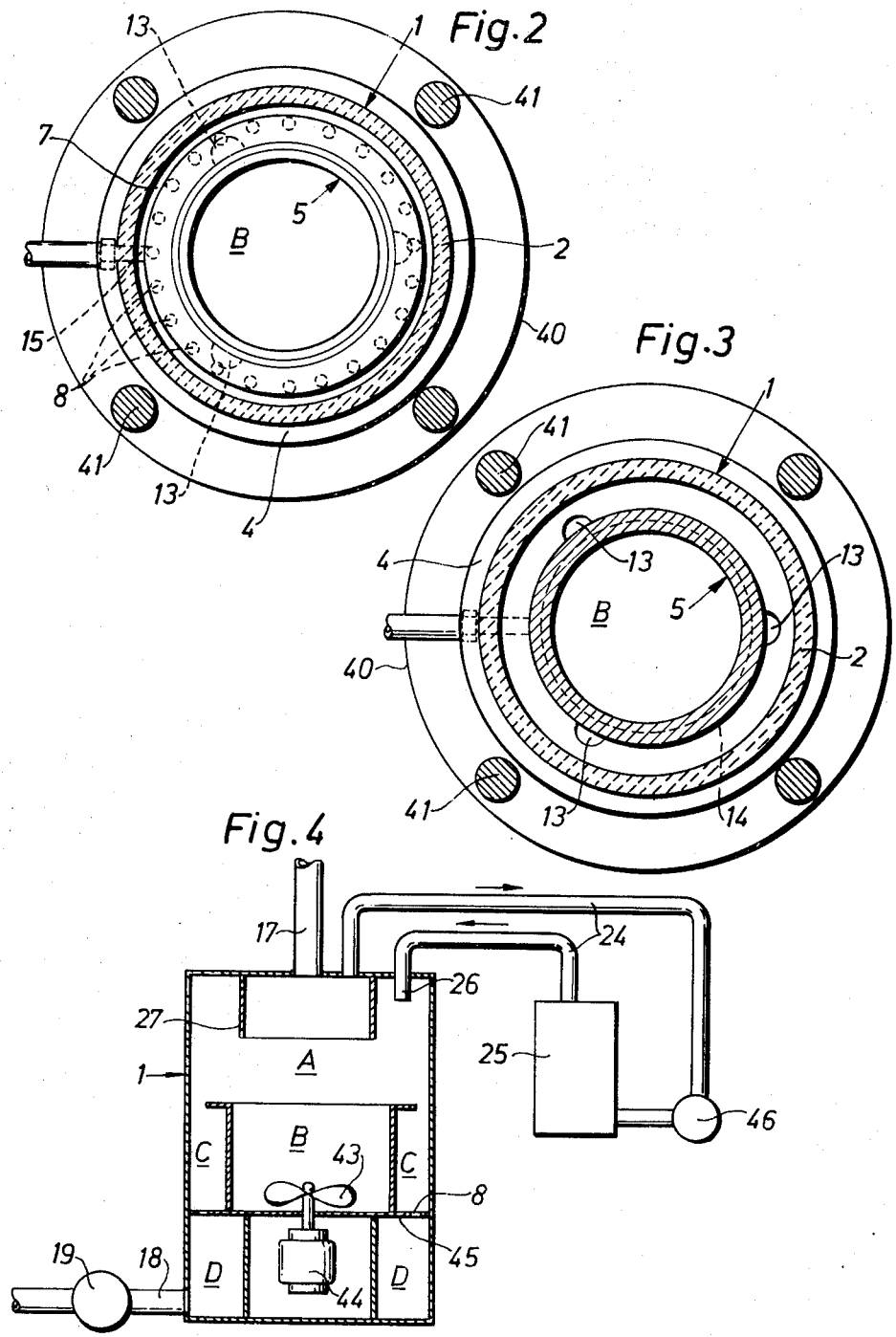

APPARATUS FOR CONTINUOUS LIQUID-LIQUID EXTRACTION OF WATER WITH A SOLVENT

The present invention relates to an apparatus for enriching chemicals in water by means of continuous liquid-liquid extraction in an extraction vessel with mechanical stirring.

The increasing concentration of chemicals menacing the environment in our waterways necessitates substantially continuous supervision of the content of certain chemicals such as oil and chlorinated hydrocarbon, particularly polychlorinated biphenyls (PCB). The presence of such chemicals in lakes and rivers causes undesirable biological results, and careful supervision of their content is therefore necessary. Since these chemicals occur in very small quantities, it has so far been difficult to develop a sufficiently reliable and robust apparatus suitable for operation at a sampling point in waterways or at sea.

The extraction devices known so far are only intended for use in laboratories. Manual extraction processes are extremely laborious and are not suitable for large quantities of water. Attempts have also been made to separate these chemicals by filtering them through carbon filters, which enable a high degree of absorption, but have the drawback that the filtrate is altered after a short time so that it is no longer identical to the chemicals originally caught. Furthermore, it has proved difficult to extract the chemicals from the carbon filter. It is also known to use porous polyurethane foam as filter, which has been found to be better than the carbon filter, but both these filters become clogged by particles in the water. This means, for instance, that it is difficult to check the water flow.

The object of the present invention is to provide an apparatus which will eliminate the drawbacks mentioned above and which, due to its robust construction, can be used for field work and, due to its simple construction, can be looked after by an unqualified operator. It should also be possible to use the apparatus immersed below the surface of the water for separation in situ. The apparatus of the invention comprises an extraction vessel, a container, open at the top, arranged in the lower part of the extraction vessel and provided with a stirrer, said container acting as a mixing container, an inlet conduit for supplying water to the container where the water is mixed with the solvent already in the extraction vessel, an outlet conduit for removing water from the bottom of the annular gap between the extraction vessel and the container, and means in this annular gap to reduce the turbulence caused by the stirring in the mixture of water and solvent moving down in this gap, so that the solvent rises to the upper part of the extraction vessel and only water is removed through the outlet conduit.

The invention will now be described with reference to the accompanying drawings illustrating two embodiments.

FIG. 1 shows a section through an extraction apparatus according to a first embodiment of the invention.
FIG. 2 is a section along the line II—II in FIG. 1.
FIG. 3 is a section along the line III—III in FIG. 1.
FIG. 4 shows a second embodiment of the invention with the addition of a means for continuously examining the extract.

The extraction apparatus according to FIGS. 1-3 comprises an extraction vessel 1 consisting of a glass cylinder 2 having a lid 3 at the top and a bottom 4. Inside the extraction vessel 1 a container 5, provided with a peripheral flange 6 sealing against the inner wall of the glass cylinder. The extraction vessel 1 is divided by the container 5 and flange 6 into an upper depositing zone A, a lower mixing zone B, an annular first separating chamber C and a second separating chamber D located below the first. The chambers C and D communicate with each other through openings 8 in the flange 6. The first separating chamber C has a cross-section which becomes wider towards the peripheral flange 6. The chamber C communicates with the zone A through an annular gap 7. The material used for the lid 3, bottom 4 and container 5 is a plastic which is resistant to the chemicals occurring, such as polytetrafluoroethylene.

The container 5 contains a rod-shaping stirring member 10 being placed freely at the bottom of the container 5. The stirring member 10 can be rotated by means of a magnetic stirrer 9, operated by a switch 38.

The lid 3 of the glass cylinder is provided with an inlet channel 11 for supplying the water to be extracted and a channel 12 which can be used for adding the solvent. The bottom plate 4 of the glass cylinder is provided with outlet openings 13 communicating through an annular groove 14 with an outlet channel 15.

The upper portion of the outer wall of the container 5 is provided with protruding portions 16, looking like saw-tooths in cross-section, thus giving the separating chamber C alternating wider and narrower sections, in order to reduce the liquid turbulence in this chamber C.

The lid 3 of the extraction vessel 1 is surmounted by a compression plate 39 which presses the lid against the top of cylinder 2. Vessel 1 is supported on an annular base 40, from which latter there extend a plurality of bolts 41, 41 which, adjacent their upper, threaded, ends extend through apertures in plate 39 and receive nuts 42, 40.

The apparatus according to FIGS. 1–3 functions in the following manner:

The extraction vessel 1 is filled to about one third of its volume with a solvent which will not mix with water, for example cyclohexane. The inlet channel 11 is connected to one end of a tube 17, the other end of which is placed in the water to be examined. A pump 19 is connected to the outlet channel 15 which, through a tube 18, draws the water through the apparatus. The reference character 37 in FIG. 1 indicates the interface between the body 36 of water and the body 35 of solvent before the stirrer 9 has been started.

Upon starting the magnetic stirrer 9 the stirring member 10 produces vigorous stirring in the vessel 5 and the adjacent zone A, thus mixing the solvent with the water entering the apparatus to form a water-solvent emulsion. Chemicals in the water which can be extracted by the solvent are thus dissolved out of the water. The stirrer 10 produces an eddy current which extends into the depositing zone with gradually decreasing effect. Since the mixing zone B is narrower, i.e. has a smaller cross-sectional area than the depositing zone, a less turbulent region is obtained just opposite the gap 7, where separation of the two liquid phases is initiated. Due to the suction force of the pump 19 the water-solvent emulsion flows into the first separation chamber C where the turbulence of the liquid is further reduced and continued separation of the lighter solvent from the extracted water takes place. Because of the difference in density, the lighter solvent will rise to the depositing zone A where the two liquids will separate into layers. From the first separation chamber C the water, together with a small quantity of solvent, will reach the second separating chamber D where the flow of water is substantially laminar and any remaining droplets of solvent will flow upwardly through the holes 8. The extracted water, which does not contain any solvent droplets leaves the apparatus through the outlet channel 15.

It will be understood that the entire quantity of solvent remains in the apparatus during the whole extraction process. When the desired quantity of water has passed through the apparatus the extraction operation is discontinued, the solvent is removed from the apparatus, and its content of substance extracted from the water is analyzed. This analysis of course depends on the nature of the substance. The analysis does not form part of this invention, and will be described here.

For an apparatus having the dimensions shown in FIG. 1 a flow rate of 1–10 liters of water per hour has been found suitable, the quantity of solvent (cyclohexane) being 250 ml. The apparatus according to the invention has enabled a concentration of polychlorinated biphenyl as low as 0.2 ng per liter of water to be analyzed.

In FIG. 4 the same reference characters as in FIGS. 1–3 have been used for equivalent parts. The apparatus according to FIG. 5 contains an external circulation conduit 24 containing means 25 for the continuous photometric analysis of the solvent. The solvent is circulated by means of a pump 46. A collar-shaped partition 27 is provided in the upper portion of the zone A to separate the two ends of the conduit 24 and to reduce the turbulence in the zone A. A propeller 43, driven by a motor 44, in the zone B mixes the two liquids to produce the water-solvent emulsion. The separating chambers C and D are separated by a wall 45 containing the openings 8. The apparatus makes it possible to ascertain continuously, in the course of the extraction process, the amount of substance having been transferred from the water to the solvent.

What we claim is:

1. Apparatus for extracting dissolved substances from water by means of a solvent, which comprises
   an extraction vessel;
   a stationary container, having side walls and a bottom but open at the top, arranged in the lower part of the extraction vessel there being an annular gap between the side walls of the container and said vessel;
   said container having therein a stirrer, and acting as a mixing container;
   an inlet conduit for supplying solvent to the vessel;
   an inlet conduit for supplying water to the container, where water is mixed with solvent in the extraction vessel;
   an outlet conduit for removing water from the bottom of the annular gap between the extraction vessel and the container; and
   means in said annular gap to reduce the turbulence caused by the stirring in the mixture of water and solvent moving down in said annular gap, so that the solvent rises to the upper part of the extraction vessel and only water is removed through the outlet conduit,
   said means for reducing the turbulence in the annular gap comprising a partition provided with openings, which partition divides said gap into an upper section and a lower section.

2. Apparatus according to claim 1, characterized in that a pump is connected to the outlet conduit in order to draw water through the apparatus.

3. Apparatus according to any of claim 1, characterized in that the means for reducing the turbulence in the gap further includes protruding parts on the wall of the upper part of the annular gap.

* * * * *